United States Patent [19]

Sakaguchi

[11] 4,151,087
[45] Apr. 24, 1979

[54] OILY-WATER SEPARATOR

[76] Inventor: Jun Sakaguchi, No. 51-G, Yaguchidai, Naka-ku, Yokohama-shi, Yokohama, Japan

[21] Appl. No.: 814,576

[22] Filed: Jul. 11, 1977

[30] Foreign Application Priority Data

Jul. 12, 1976 [JP] Japan .............................. 51-91644[U]

[51] Int. Cl.$^2$ ............................................. B01D 17/02
[52] U.S. Cl. .................................... 210/109; 210/123; 210/307; 210/540; 210/DIG. 5
[58] Field of Search ...................... 210/96 A, 104, 116, 210/115, 110, 307, 540, DIG. 5, 109, 123

[56] References Cited

U.S. PATENT DOCUMENTS 3,468,421  9/1969  Hazel et al. ........................ 210/115 X
3,738,492  6/1973  Trillich .......................... 210/DIG. 5
3,966,603  6/1976  Grant ................................ 210/96 R Primary Examiner—John Adee
Attorney, Agent, or Firm—Sughrue, Rothwell, Mion, Zinn and Macpeak

[57] ABSTRACT

An oily-water separator comprises a single vessel having a partition wall dividing the interior of the vessel into an upper and a lower chamber, a filter device disposed coaxially within the vessel and extending into the both chamber, an oil-water mixture inlet opened at a lower portion of the upper chamber, a first oil outlet opened at a top portion of the upper chamber, a second oil outlet connected to a top of the filter device, a third oil outlet opened at an upper portion of the lower chamber and a water outlet opened at a lower portion of the lower chamber.

5 Claims, 3 Drawing Figures

OILY-WATER SEPARATOR

BACKGROUND OF THE INVENTION

The present invention relates to an oily-water separator utilizing coalescing effect and, in particular, to an improvement of the oily-water separator of the type.

In the conventional oily-water separator uitilizing the coalescing effect of oil particles, it has been usual to remove a greater part of oil and dusts at the first stage, to separate relatively small oil particles from water by a first coalescing at the second stage and then to separate fine oil particles from water by a second coalescing or to absorb them at the third stage.

This method is practically satisfactory, and one example of the separator of the type has been manufactured and sold by KEENE corporation, Cookeville, Tenn., U.S.A. under the name of KEENE mini.

FIG. 1 shows a schematic functional structure of the separator of the type, in which three vessels A, B and C are employed to perform the three stage functions mentioned previously, respectively.

However, since the stages used in this system function differently from each other, the number of the vessels must be the same as that of the stages, thus making the separator of this type voluminous and suitable for applications such as on board of ships wherein the space for installation is restricted. Further, for a full automatic operation of the three vessel system, an automatic oil discharge device must be provided for each vessel, making the total cost of the system expensive.

SUMMARY OF THE INVENTION

An object of the present invention is to provide a compact oily-water separator.

Another object of the present invention is to reduce the number of vessels required by the oily-water separator of the type.

These objects are achieved, according to the present invention, by using a single vessel which can perform the functions to be performed in three different vessels located separately. According to the present invention, the single vessel of up-stand type has a partition wall which divides the interior of the single vessel into two chamber, upper chamber and lower chamber. A cylindrical filter device is supported by the partition wall so that an upper portion of the filter device is disposed in the upper chamber and a lower portion of the device in the lower chamber. The upper chamber is provided at a lower and top portions thereof with an oil-water mixture inlet and a first oil outlet, respectively and the lower chamber is provided at an upper and lower portions thereof with a third oil outlet and a water outlet, respectively. A second oil outlet is connected to the top of the filter device.

DESCRIPTION OF THE PREFERRED EMBODIMENTS

Figure 1:
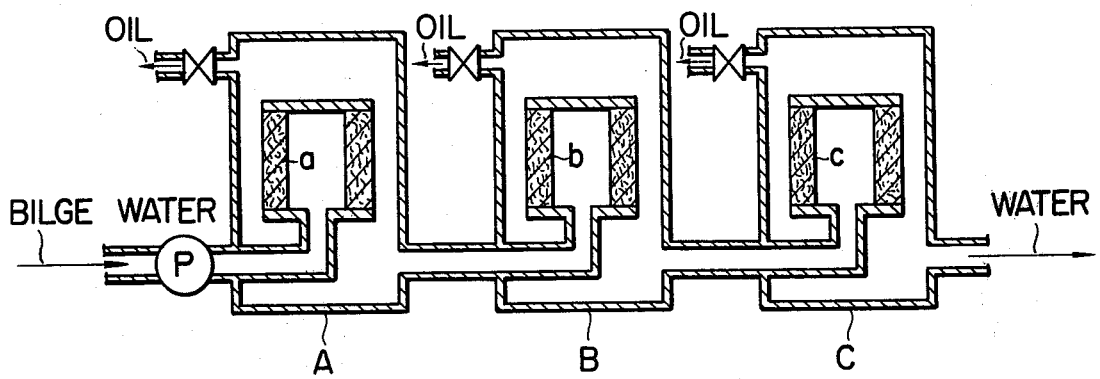
FIG. 1 is a schematic and functional illustration of the conventional oily-water separator.
Figure 2:
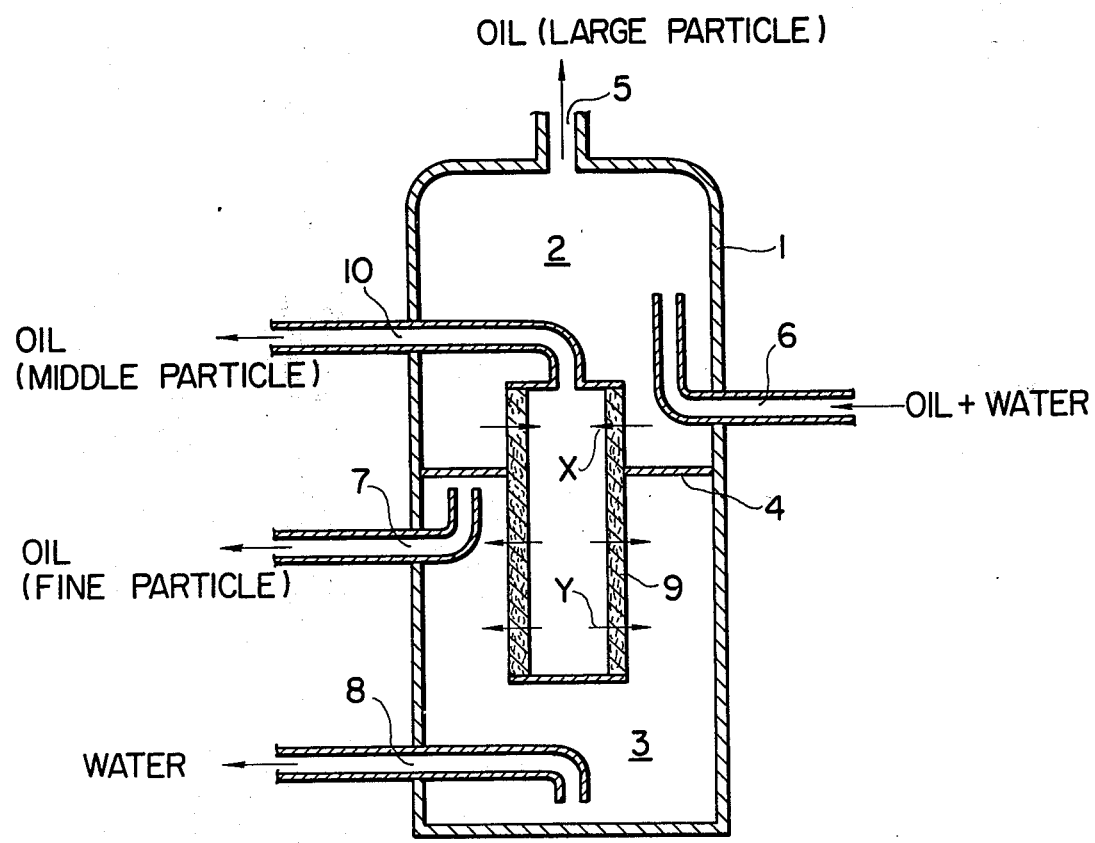
FIG. 2 is a schematic illustration of an embodiment of the present invention.

In FIG. 2, an oily-water separator according to the present invention comprises a vessel 1 in which a partition wall 4 divides the interior of the vessel 1 into two chamber, an upper chamber 2 and a lower chamber 3. A cylindrical filter 9 passes through the partition wall 4 and is supported thereby or by any suitable means.

At the lower portion of the upper chamber 2, an oily water supply pipe 6 is connected to supply a mixture of water and oil, such as bildge water of ship, to the upper chamber 2, under pressure by a pump. The upper chamber 2 is further provided at the top thereof with a first oil outlet 5.

The lower chamber 3 is provided in an upper and a lower portions thereof with a third oil outlet 7 and a water outlet 8, respectively.

The filter 9 of oleophilic material such as polypropylene is in the cylinder shape as mentioned previously whose lower end is suitably closed. The upper end of the filter 9 is also closed by a plate having an opening which is connected to a second oil outlet 10.

In operation, the interior of the vessel 1 is initially filled with water. The bildge water is supplied under pressure by a pump, through the supply pipe 6 into the upper chamber 2. A major oil portion in the bildge water which may be in the relatively large particles may go up due to the bouyancy of oil and is discharged through the first oil outlet 5. The remaining bildge water which may thus contatin relatively small oil particles is forced to pass through the upper portion of the filter 9 existing in the upper chamber 2 as shown by arrows X. In the filter 9, the small oil particles are coalesced into larger particles when they pass into the interior of the cylindrical filter 9.

Again, the oil particles in the interior of the filter 9 go up and discharged through the second oil outlet 10, causing the content of the filter interior to be water containing a small amount of oil in the form of small particles.

The content of the filter interior is further forced to pass through the lower portion of the filter 9 as shown by arrows Y and the oil particles therein are again coalesced by the filter to form larger oil particles which are pushed into the lower chamber 3 in which the oil particles go up and are discharged through the third oil outlet 7.

Therefore, the lower portion of the lower chamber 3 is filled with only water which is discharged through the water outlet 8.

As will be understood from the foregoings, the upper chamber 2 including the upper portion of the filter 9 functions as a combination of the first and second vessels A and B in the conventional separator.

Figure 3:
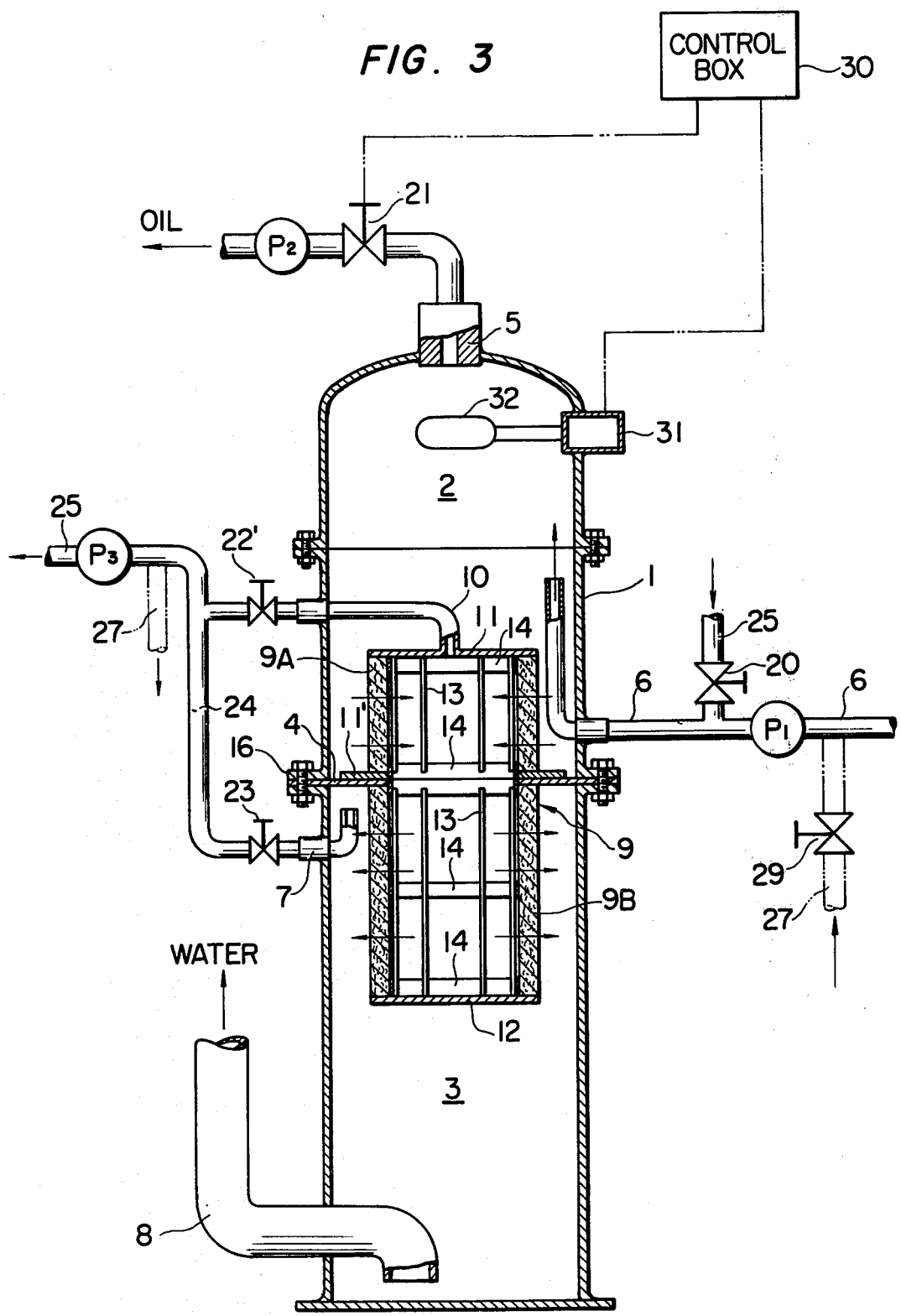
FIG. 3 is a cross sectional view of another embodiment which is comtemplated to operate automatically.

FIG. 3 shows, in partially cross section, an oily-water separator designed according to the present invention. The major parts thereof are similar to those shown in FIG. 2 and represented by the same reference numerals.

In FIG. 3, the vessel 1 is constituted with a flanged upper and lower halves to be connected by suitable fixening means such as bolt-nut means 16 through the partition wall 4 having in this case a center hole, which defines the upper and the lower chambers 2 and 3, respectively. In this structure, the supply pipe 6 is connected to the lower portion of the upper half vessel through a pump $P_1$.

The upper portion 9A of the filter 9 is supported by an upper plate 11, a lower annular plate 11' and an inner support structure composed of rings 14 and vertical supports 13.

The lower portion 9B of the filter 9 is supported by the partition wall 4, a bottom plate 12 and an inner support structure composed of rings 14 and vertical supports 13 as shown. When assembled, the lower plate 11' of the upper filter portion 9A is rested on the partition wall 4, coaxially.

The supply pipe 6 is provided in the downstream side thereof with a branch 25 which has a valve 20 and the first oil outlet 5 is provided with an electromagnetic valve 21. The second and third oil outlets 10 and 7 are connected through valves 22 and 23, respectively to a common pipe 24 connected to an inlet of a small suction pump $P_3$, an outlet of which is connected to a pipe 25. The valves 22 and 23 may be omitted, if necessary. An oil detector 31 is mounted on the wall of the upper half of the vessel 1. The detector 31 may be provided with a sensor such as float 32 extending into the vicinity of the first oil outlet 5 to detect a certain amount of oil accumulated in the upper part of the upper chamber 2.

A control device 30 may be provided which functions in response to a detection output signal from the detector 31 to control the valve 21 so that the latter is opened intermittently to discharge the accumulated oil.

The embodiment in FIG. 3 is substantially the same as that of the embodiment in FIG. 2, except that the pipe 25 connected to the outlet of the pump $P_3$ is connected to the pipe 6. Therefore, the oil discharged from the filter device 9 and the lower chamber 3 are returned to the supply pipe 6, resulting in a reduction of the number of oil discharge equipments. That is, an oil discharge equipment required by the oil discharge from the pump $P_3$ becomes unnecessary and the oil discharge is automatically controlled by only the combination of the oil detector 31, 32, the control device 30 and the electromagnetic valve 21.

As a modification of the embodiment in FIG. 3, a branch pipe 27 having a valve 29, one end of which is connected to the upstream side of the pump $P_1$ and the other end of which is connected to the pipe 24 as shown by dotted lines in FIG. 3, may be used as a substitute for the pump $P_3$, the branch pipe 25 and the valve 20. With this arrangement, the structural requirement is reduced while the advantages in discharging oil is maintained.

It should be noted that the separators of the present invention may be modified from those shown in Figures suitably. For example, it may be possible to arrange a plurality of the filter devices 9 vertically in stack. Further, although the foat type detector 31, 32 is shown, it may take any suitable construction. For example, instead of the float, a capacitive detector may be utilized to detect the predetermined amount of oil in the upper chamber 2.

What is claimed is:

1. An oily-water separator comprising a vessel having at least one partition wall for separating an interior of said vessel into at least an upper and a lower chamber and at least one generally cylindrical filter device disposed within said vessel and extending into both said upper and lower chambers, said filter device having an upper and lower end closed by an upper plate having an opening and a lower plate, respectively, an oily water supply pipe connected to said upper chamber, a first oil outlet connected to a top portion of said upper chamber, a second oil outlet connected to said opening of said upper plate of said filter device, a third oil outlet connected to an upper portion of said lower chamber and a water outlet connected to a lower portion of said lower chamber and a first pump means connected to said oily water supply pipe for supplying, under pressure, water containing oil to said upper chamber.

2. An oily-water separator claimed in claim 1, further comprising an oil detecting means detecting a predetermined amount of oil accumulated in an upper portion of said upper chamber to provide an electric signal and means responsive to said electric signal to control an electromagnetic valve to allow a discharge of the oil therethrough.

3. An oily-water separator claimed in claim 2, further comprising a first means for connecting said second and third oil outlets all together.

4. An oily-water separator claimed in claim 3, further comprising a second pump means having a suction inlet connected to said first means and an outlet connected to a downstream side of said first pump means.

5. An oily-water separator claimed in claim 3, further comprising a pipe means for connecting said first means to an upstream side of said first pump means.

* * * * *